G. F. SHELDON.
SEED POTATO CUTTER.
APPLICATION FILED MAR. 18, 1922.
1,432,420.
Patented Oct. 17, 1922.
2 SHEETS—SHEET 1.
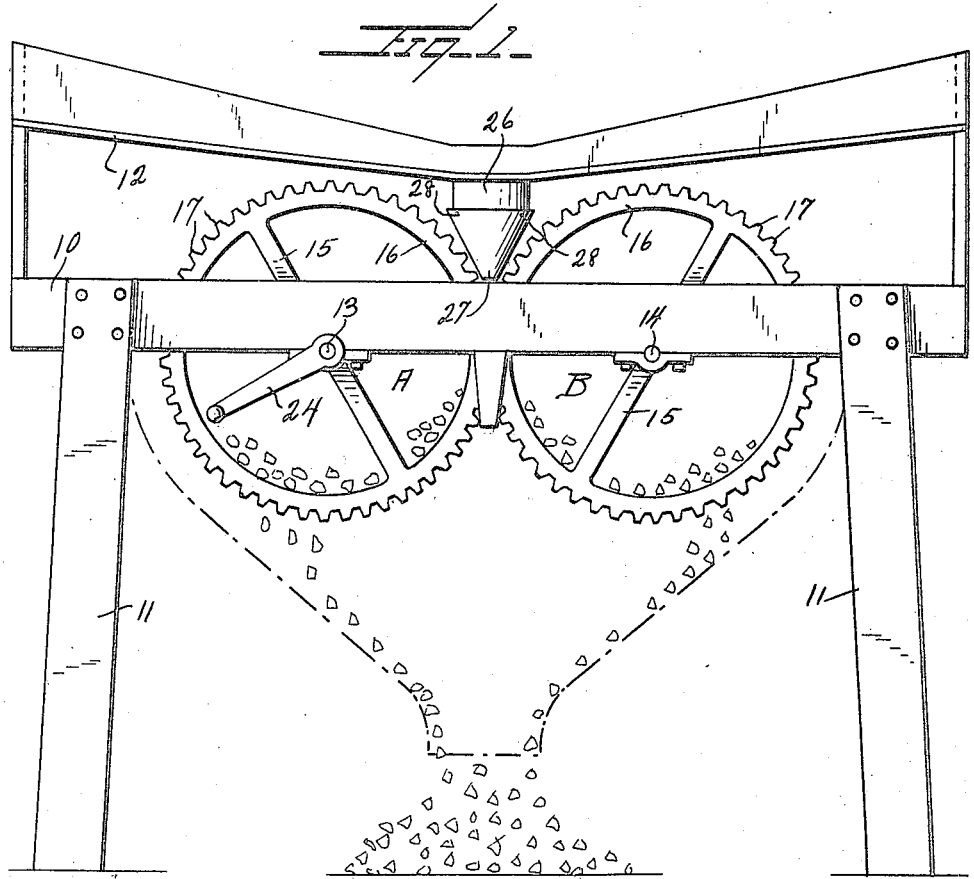
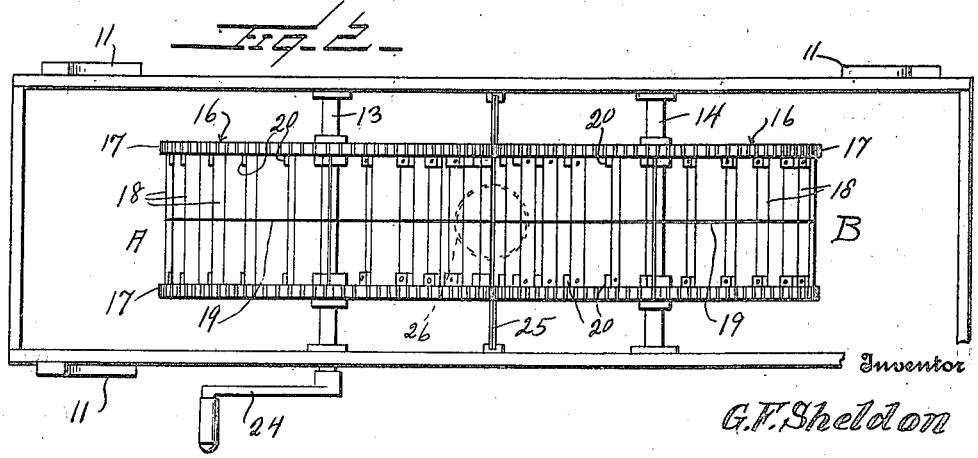
Inventor
G. F. Sheldon
By Watson E. Coleman
Attorney

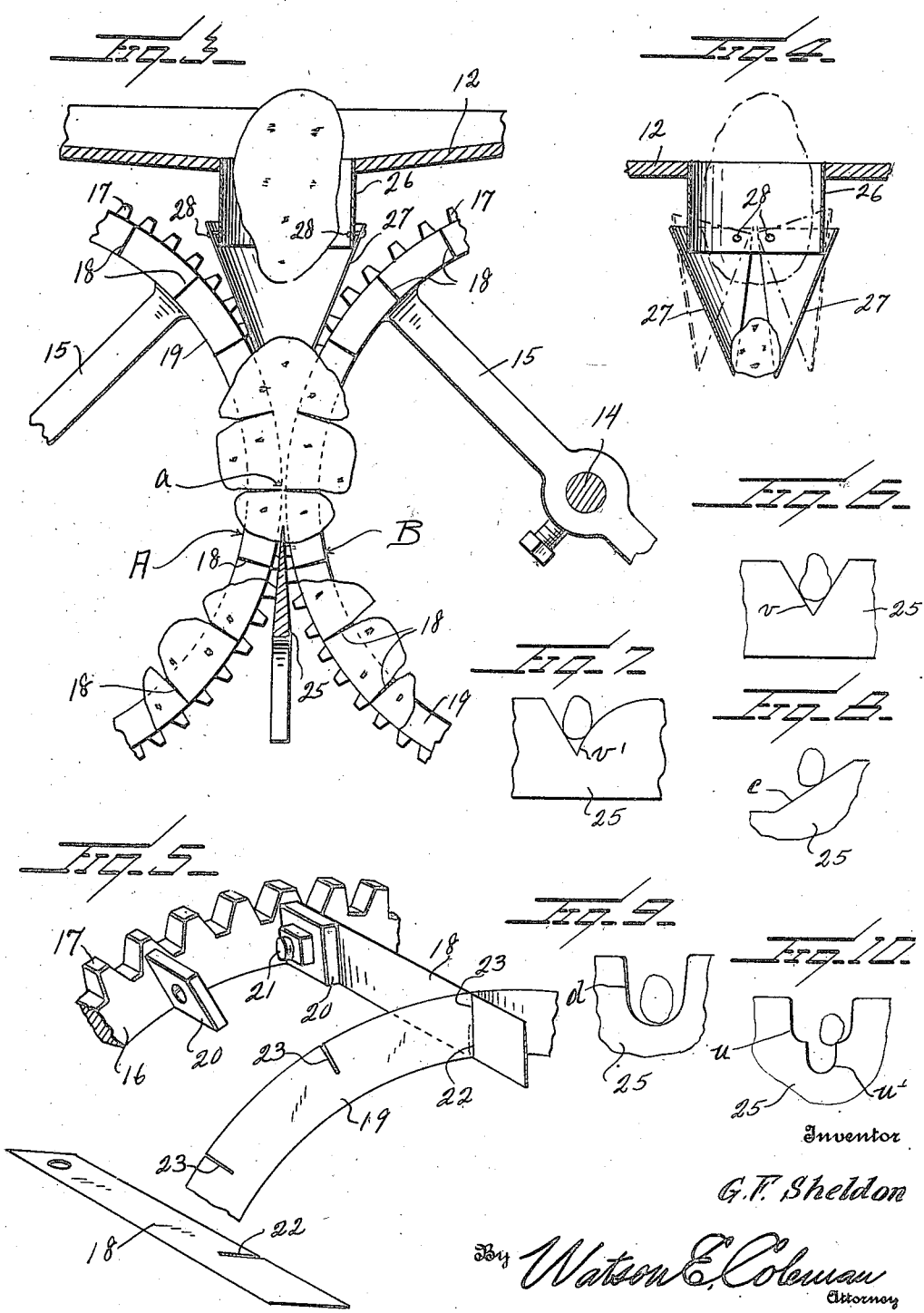

Patented Oct. 17, 1922.

1,432,420

UNITED STATES PATENT OFFICE.

GEORGE F. SHELDON, OF FARGO, NORTH DAKOTA.

SEED-POTATO CUTTER.

Application filed March 18, 1922. Serial No. 544,870.

*To all whom it may concern:*

Be it known that I, GEORGE F. SHELDON, a citizen of the United States, residing at Fargo, in the county of Cass and State of North Dakota, have invented certain new and useful Improvements in Seed-Potato Cutters, of which the following is a specification, reference being had to the accompanying drawings.

This invention relates to devices for cutting vegetables into pieces, and particularly to mechanism of this kind designed for the purpose of cutting seed potatoes.

An efficient potato cutter must cut potatoes for seed in such a manner that all or nearly all pieces have each one or more "eyes," and further in order to save time and labor the operation of the cutter must be efficient, easy and rapid. Seed potato cutters have heretofore been constructed but they have either been slow or have cut inaccurately or have destroyed a portion of the seed by bruising the potato through the use of pushers, plungers and the like.

The general object of this invention is to provide an easily operated and continuously operable potato cutter so designed as to cut the potatoes into pieces, each of which will contain one or more eyes, without, however, in any manner bruising or injuring the potatoes.

A further object is to provide a mechanism of this character which will cut a potato longitudinally and also transversely and then again cut the pieces so formed longitudinally so that a potato will be divided into four, eight or more pieces, according to its size.

A still further object is to provide a machine of this character in which each seed potato is guided into the machine so that it is divided at its middle longitudinally, the potato being divided transversely by a series of knives which move inward from each side of the potato and meet in the middle of the potato and these knives acting to automatically carry the potato across or against a stationary cross knife, thus dividing the potato approximately at the middle in a direction at right angles to the cut made by the first named knife.

A still further object is to provide a machine of this character which includes two rotatable members, each carrying a circumferentially extending knife blade and transversely extending knife blades or cutters, the knife blades rotating in paths which at one point approximate each other so that the knife blades of the two rotatable members will meet through the potato, there being a fixed knife blade disposed below the rotatable members and in the path of movement of the cut potato by which the potato is again cut transversely of the cut made by the circumferentially extending knives.

Another object is to provide a potato guide which will direct medium and small potatoes to a point midway between the two revolving series of cutters so that these small potatoes will be cut properly and divided into approximately equal portions by the knives in the same manner that a large potato is so cut.

Still another object is to improve the shape of the fixed knife so that a shearing cut will be secured.

Other objects will appear in the course of the following description.

My invention is illustrated in the accompanying drawings, wherein:—

Figure 1 is a side elevation of a potato cutting machine constructed in accordance with my invention;

Figure 2 is a top plan view thereof;

Figure 3 is an enlarged longitudinal sectional view showing the manner in which the potatoes are cut;

Figure 4 is a vertical sectional view of the hopper taken at right angles to the section in Figure 3;

Figure 5 is a fragmentary perspective view of one of the rims and associated cutting knives;

Figures 6, 7, 8, 9 and 10 are fragmentary elevations of various forms of the fixed cutting knife 25.

Referring to these drawings, 10 designates a supporting frame having legs 11, this frame being of any suitable character and supporting a table 12. Disposed below the table and mounted on transverse axles or shafts 13 and 14 are rotatable elements carrying a series of cutters. Each rotatable element comprises the axle 13 (or 14 as the case may be), the radially directed spokes 15, spaced circumferentially rims 16 preferably having gear teeth 17, a transversely extending series of knives 18, and a single circumferential knife 19. As illustrated, the transverse knives 18 are supported at their ends on lugs 20 projecting outward from the rim 16 and apertured for the passage of bolts 21 which extend through the ends of the knives. As illustrated in Figure 5, each transverse knife 18 is notched at its middle, as at 22, and disposed circumferentially is the single cutting knife or cutter 19 which is notched at intervals, as at 23, so as to receive the knives 18. It will be obvious that the cutting edges of the knives 18 will be flush with the cutting edge of the knife 19. Each of the rotatable cutters is alike in construction and I have lettered one of the rotatable cutters as A and the other B for distinction. It will be seen that the gear teeth 17 of these rotatable cutters engage with each other, and one of the shafts, as for instance the shaft 13, may be driven by means of a crank 24 or by any other suitable means. The knives 18 and 19 of the rotatable cutters approximately touch each other at the point $a$.

Disposed below this point $a$ is a transversely extending knife 25 past which a potato is drawn by the revolving elements, as illustrated in Figure 3. Immediately above the point $a$ and disposed midway between the rotatable elements is a potato guide comprising an annular casing, or hopper or receiver 26 large enough to surround the largest size potato, and pivotally mounted upon the lower end of this casing are the two half conical sections 27 pivoted at 28. These sections close by gravity and open by the weight of the potato. A very large potato will open the sections as shown by dotted lines in Figure 4, while a small potato will only open the sections as shown in full lines. As a consequence every potato is centered before its discharge between the rotatable cutter supporting members, whether the potato be large or small.

The table 12 is preferably inclined downward or is in the form of a shallow hopper having a centrally disposed opening whereby the potatoes may be shifted into the receiver 26 or it may be made in any suitable manner, as I do not wish to be limited to any particular form for this table.

In the operation of my mechanism, the potatoes are fed in one by one by hand into the receiver and drop down, as illustrated in Figure 3, into the space between the two rotating series of knives. As these knives rotate, the transverse knives will catch the potato and draw it downward, while the circumferential knives 19 will cut into the potato longitudinally. When any pair of knives reach the point $a$, they will have cut through the potato and meet, while at the same time the circumferential knives will cut the potato half in two longitudinally in a plane at right angles to the plane of rotation of the shafts 13 and 14. The sections will be carried downward and will meet the transversely extending knife 28, which will again cut the potato longitudinally but this time at right angles to the cut made by the circumferential knives 19. The sections of the potato will then fall downward into the interior of the revolving elements and drop out from between the cross knives of the revolving elements, as illustrated in Figure 1. As before remarked, each potato without regard to its size will be guided so that the cuts will be made centrally with relation to the potato and thus the potato, without regard to its size, will be cut into equal proportions. Small potatoes will be cut into four quarters, larger potatoes into eight and twelve pieces. Cutting the potatoes in this manner insures that each piece shall have at least one eye. It will be seen that the potato is not bruised or crushed in any way because the body of the potato is not touched. It is simply the knives that pass into the potato and meet and the potato is not cut nor injured.

I do not wish to be limited to the particular manner illustrated of gearing the two rotatable elements A and B to each other, though this is a convenient manner of making these two elements and causing them to rotate at the same rate of speed. It is obvious, however, that the shafts of the two elements might be geared with each other in an obvious manner to secure this same result. Preferably the fixed knife 25 will have one of the forms illustrated in Figures 6 to 10, that is the knife will have an inclined V-shaped notch, as at $v$ or $v'$, an inclined cutting edge, as at $c$, a U-shaped cutting edge, as at $d$, or a cutting edge having a relatively large U-shaped portion $u$ and a relatively smaller U-shaped portion $u'$ forming a continuation of the U-shaped cutting portion $u$. Thus it will be seen that the advancing potato always meets a cutting edge at other than a right angle and thus a shearing stroke is made in the potato which greatly reduces the amount of force required to make a cut. In other words, the cut is made obliquely.

It will be seen that this mechanism provides a very efficient and rapid device for cutting seed potatoes which will not crush and destroy portions of the potato and has a continuous motion. I have found in actual trial that it is several times faster than most of the seed cutting potato devices now in use. The arrangement of the knives is such that resistance is reduced to a minimum, thus requiring little power, and the potato is evenly cut, whether large or small.

While I have illustrated a construction which I have found to be thoroughly effective in actual practice, I do not wish to be limited to the details, as it is obvious that the principle of the invention might be embodied in other forms without departing from the spirit of the invention as defined in the appended claims.

I claim:—

1. A vegetable cutter of the character described comprising a movable cutting element and means for guiding a vegetable into position to be cut by the element comprising a hollow guide member to receive the vegetable, and two half conical sections, each section pivoted at its inner corner to said guide member, the sections swinging together by gravity and opening under the weight of a vegetable.

2. A potato cutter of the character described including two rotatable elements, each having a circumferential knife and a plurality of transversely extending knives, the knives on the rotatable elements being adapted to register with each other and approximate in their paths of movement, means for rotating the rotatable elements in opposite directions, means for guiding the potato into a central position between the said rotatable elements, and a transversely extending knife disposed beneath the point of approximation of the two rotatable elements.

3. A potato cutter of the character described including a supporting frame, two rotatable elements mounted upon said frame, each having spaced rims, transversely extending knives mounted upon said rims and supported thereby and a circumferentially extending knife disposed midway between the rims, the knives of one element being adapted to register with the knives of the other element, the paths of the two elements approximating at one point, and means for rotating both of said elements simultaneously in opposite directions, a transversely extending knife disposed beneath the point of approximation of the two elements, and a potato guide disposed above the point of approximation.

4. A potato cutter of the character described including a supporting frame, two rotatable elements mounted upon said frame, each having spaced rims, transversely extending knives mounted upon said rims and supported thereby and a circumferentially extending knife disposed midway between the rims, the knives of one element being adapted to register with the knives of the other element, the paths of the two elements approximating at one point, means for rotating both of said elements simultaneously in opposite directions, a transversely extending knife disposed beneath the point of approximation of the two elements, and a potato guide disposed above the point of approximation, said potato guide having a conical lower end formed with two sections pivoted to the guide, the lower ends of the sections swinging together but separating under the weight of a potato, the sections moving in a plane at right angles to the plane of rotation of the rotatable elements.

5. A potato cutter comprising a supporting frame, a pair of parallel shafts mounted upon the frame, rotatable cutting members mounted upon the shafts and each including a pair of parallel rims, the transverse knives disposed equi-distantly from each other and connected to said rims, a circumferential knife midway between the rims, the abutting edges of the circumferential and transverse knifes being notched to fit into each other, the paths of movement of the rotatable elements approximating at one point, means for giving a simultaneous rotation in opposite directions to the elements and whereby the approximating portions of the rotatable elements will move downward, a transversely extending knife disposed below the point of approximation of the elements, and a potato guide disposed above the point of approximation of the elements and having two laterally movable bottom sections, and a fixed knife having its cutting edge disposed at less than a right angle to the path of movement of the sections of the potato whereby to give a shearing cut.

6. A potato cutter of the character described including two rotatable elements, each having a plurality of transversely extending knives and a circumferential knife, the knives on the rotatable elements being adapted to register with each other and approximate in their paths of movement, means for guiding the potato into a central position between the said rotatable elements comprising a hollow receiver open at its lower end and disposed with its center immediately above the point of approximation of the rotatable elements, and semi-conical sections pivoted at their inner corners to the lower end of the receiver, said sections swinging closed by gravity and opening laterally under the weight of a potato, the plane of movement of said sections being at right angles to the plane of movement of the rotatable elements.

In testimony whereof I hereunto affix my signature.

GEORGE F. SHELDON.